United States Patent
Fukushima et al.

(10) Patent No.: US 7,441,637 B2
(45) Date of Patent: Oct. 28, 2008

(54) HYDRAULIC SHOCK ABSORBER

(75) Inventors: Masaru Fukushima, Tokyo (JP); Masahiro Miwa, Tokyo (JP)

(73) Assignee: Kayaba Industry Co., Ltd., Tokyo (JP)

( * ) Notice: Subject to any disclaimer, the term of this patent is extended or adjusted under 35 U.S.C. 154(b) by 6 days.

(21) Appl. No.: 11/193,618

(22) Filed: Aug. 1, 2005

(65) Prior Publication Data

US 2006/0027431 A1 Feb. 9, 2006

(30) Foreign Application Priority Data

Aug. 6, 2004 (JP) ............... 2004-230042
Oct. 8, 2004 (JP) ............... 2004-295888

(51) Int. Cl.
*F16F 9/34* (2006.01)

(52) U.S. Cl. .................. 188/284; 188/315; 267/153; 267/139; 267/140; 267/116

(58) Field of Classification Search ............ 188/284, 188/315; 267/153, 139, 140, 116
See application file for complete search history.

(56) References Cited

U.S. PATENT DOCUMENTS

| | | | | |
|---|---|---|---|---|
| 3,958,673 A | * | 5/1976 | Allinquant et al. | ..... 188/322.14 |
| 4,527,674 A | * | 7/1985 | Mourray | ..................... 188/284 |
| 4,602,707 A | * | 7/1986 | Zumwinkel et al. | ......... 188/315 |
| 4,838,393 A | | 6/1989 | Mourray et al. | |
| 5,178,243 A | * | 1/1993 | Hamada et al. | ........ 188/322.17 |
| 5,667,041 A | * | 9/1997 | Jensen | ......................... 188/284 |
| 6,644,446 B2 | * | 11/2003 | Kachi et al. | ............ 188/322.17 |

FOREIGN PATENT DOCUMENTS

| | | |
|---|---|---|
| DE | 78 02 898 | 8/1978 |
| EP | 0 059 150 | 9/1982 |
| GB | 1 447 295 | 8/1976 |
| JP | 9-14328 | 1/1997 |
| JP | 09-014328 | 1/1997 |
| JP | 10-252826 | 9/1998 |
| JP | 11-325159 | 11/1999 |
| JP | 2000-120757 | 4/2000 |
| JP | 2002-39252 | 2/2002 |
| KR | 1998-029769 | 7/1998 |
| KR | 1999-0049122 | 7/1999 |
| KR | 20-0178172 | 5/2000 |

* cited by examiner

*Primary Examiner*—Robert A Siconolfi
*Assistant Examiner*—Mahbubur Rashid
(74) *Attorney, Agent, or Firm*—Rabin & Berdo, PC

(57) ABSTRACT

In a hydraulic shock absorber (1), a piston rod (5) protrudes from a cylinder (3) filled with hydraulic fluid. A rebound cushion (8) is fitted to an outer circumferential surface of the piston rod (5) in the cylinder (3). A stopper (6) fixed to the cylinder (3) contacts the rebound cushion (8) at an protrusion limiting position of the piston rod (5) to prevent further protrusion of the piston rod (5). An oil pool (8a, 9, 10, 15) formed in a sliding surface (8a, 14) of the rebound cushion (8) supplies oil to the sliding surface that slides on any of the inner circumferential surface of the cylinder (3) and the outer circumferential surface of the piston rod (5) to ensure smooth relative rotation of the piston rod (5) at the protrusion limiting position and the cylinder (3).

3 Claims, 7 Drawing Sheets

HYDRAULIC SHOCK ABSORBER

FIELD OF THE INVENTION

This invention relates to a rebound cushion that is provided in a hydraulic shock absorber, for a vehicle, for example.

BACKGROUND OF THE INVENTION

Tokkai-Hei 9-14328 (UP H09-14328 A) published by the Japan Patent Office in 1997 proposes a piston rod of a hydraulic shock absorber for a vehicle with a rebound cushion.

The piston rod is fixed to a piston which reciprocates in a cylinder, and protrudes axially from the cylinder. A rod guide provided at an opening of the cylinder guides the axial movement of the piston rod.

The rebound cushion is made of elastic material, fitted on the outer circumference of the piston rod, and restricts the protrusion of the piston rod at a predetermined protrusion limiting position by coming into contact with the rod guide.

SUMMARY OF THE INVENTION

Referring to FIG. 10 of the drawings, the hydraulic shock absorber according to the prior art is a strut type hydraulic shock absorber for a vehicle, wherein a rod guide 53 closes an opening of a cylinder 51, and guides a piston rod 52 so as to be free to slide in an axial direction.

The cylinder 51 is filled with hydraulic fluid.

In the cylinder 51, a flange member 54 is fixed to the piston rod 52, and a rebound cushion 55 made of a rubber material such as Neutral Betiding Rubber (NOR) or synthetic rubber in a cylindrical shape is fitted to the piston rod 52 and axially supported by the flange member 54.

Referring to FIG. 11, when the piston rod 52 has reached the predetermined protrusion limiting position, the rebound cushion 55 compressed between the rod guide 53 and flange member 54 and absorbs the shock that is generated accompanying the restriction of further protrusion of the piston rod 52.

In the vehicle, front wheels change their direction when a driver of the vehicle operates the steering wheel to steer the vehicle. When the hydraulic shock absorber is applied to the suspension system for the front wheels, the piston rod 52 is fixed to a vehicle body whereas the cylinder 51 is fixed to the front wheel, for example. According to this arrangement, when the driver operates the steering wheel, the cylinder 51 together with the rod guide 53 rotates with respect to the piston rod 52.

An outer circumferential surface of the rebound cushion 55 is not in contact with an inner circumferential surface of the cylinder 51 as long as the rebound cushion 55 is not deformed. When the relative rotation between the cylinder 51 and the piston rod 52 takes place in this state, therefore, the rebound cushion 55 rotates together with the piston rod 52.

However, when the piston rod 52 has reached the protrusion limiting position as shown in FIG. 11, the rebound cushion 55 bulges outward due to compressive force exerted by the rod guide 53 and flange member 54, and its outer circumferential surface 55a of the rebound cushion 55 is pressed against the inner circumferential surface of the cylinder 51.

Due to the pressure acting between these two surfaces, hydraulic fluid existing between the two surfaces may be removed and a phenomenon so called an oil film tearing or solid-to-solid contact may occur between these two surfaces. If the driver operates the steering wheel in this state, a noise may be generated and/or the durability of the rebound cushion 55 may be adversely affected due to the relative rotation of the rebound cushion 55 and the cylinder 51 while they are in solid-to-solid contact.

It is therefore an object of this invention to prevent oil film on a sliding surface of the rebound cushion from tearing when the steering wheel is operated in a state where the piston rod is fully protruded from the cylinder.

In order to achieve the above object, this invention provides a hydraulic shock absorber comprising a cylinder having an inner space filled with hydraulic fluid, a piston rod which axially protrudes from the cylinder, a rebound cushion which is fitted to an outer circumferential surface of the piston rod in the cylinder and supported axially by the piston rod, a stopper fixed to the cylinder and contacting the rebound cushion at an protrusion limiting position of the piston rod to prevent further protrusion of the piston rod, and an oil pool formed in a sliding surface of the rebound cushion.

According to an aspect of this invention, the sliding surface is an inner circumferential surface of the rebound cushion which slides on an outer circumferential surface of the piston rod. According to another aspect of this invention, the sliding surface is an outer circumferential surface of the rebound cushion which slides on an inner circumferential surface of the cylinder.

The details as well as other features and advantages of this invention are set forth in the remainder of the specification and are shown in the accompanying drawings.

DESCRIPTION OF THE PREFERRED EMBODIMENTS

The embodiments in which this invention is applied to a double-tube strut-type hydraulic shock absorber for front wheels, i.e., steered wheels, of a vehicle will be explained.

Figure 1:
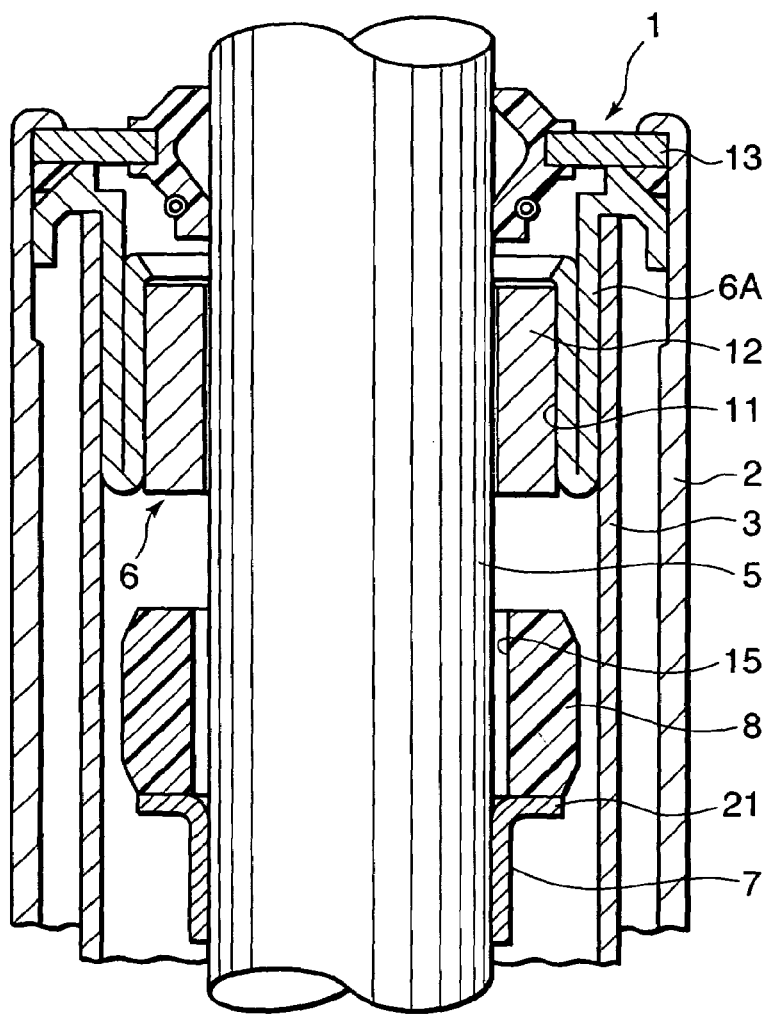
FIG. 1 is a longitudinal sectional view of essential parts of a hydraulic shock absorber according to this invention.

Referring to FIG. 1 of the drawings, a hydraulic shock absorber 1 comprises an inner tube 3 coaxially disposed in an outer tube 2, and a piston rod 5 fixed to a piston that slides axially in the inner tube 3. The inner tube 3 corresponds to the cylinder in the claims.

A rod guide 6 that allows the piston rod 5 to protrude outward from the inner tube 3 is fixed to an upper end of the inner tube 3 and outer tube 2. A support member 7 and a rebound cushion 8 are fitted to the outer circumference of the piston rod 5.

The rod guide 6 comprises a holder 6A and a bearing member 12 which is supported by the holder 6A. The base of the holder 6A is fitted to the inner circumference of the upper end of the outer tube 2 while the tip is press fitted into the upper end opening of the inner tube 3. The bearing member 12 is fitted into the tip of the holder 6A and allows the piston rod 5 to protrude upward from the inner tube 3.

A seal member 13 which is in contact with the protruding piston rod 5 is fitted to the upper end of the outer tube 2 at a position above the rod guide 6. For this purpose, the upper end of the outer tube 2 is caulked inward, and the seal member 13 and the base of the holder 6A are gripped between this caulked portion and the upper end of the inner tube 3

The support member 7 is fixed to the outer circumference of the piston rod 5 by welding for example. The support member 7 is provided with a flange part 21 at its upper end.

The rebound cushion 8 is a cylindrical member formed of a material such as natural rubber, synthetic rubber or synthetic resin, and is fitted to the outer circumference of the piston rod 5 just above the flange part 21.

Figure 2:
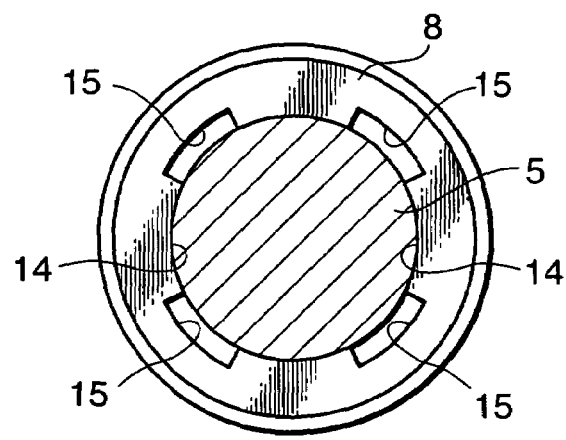
FIG. 2 is a plan view of a rebound cushion according to this invention.

Referring to FIG. 2, four vertical grooves 15 which work as an oil pool are formed at intervals of ninety degrees in an inner circumferential surface 14 of the rebound cushion 8 that is in contact with the outer circumferential surface of the piston rod 5. The upper end and lower end of each of the grooves 15 are open to the inner space of the inner tube 3 so as to induce oil in the inner tube 3 to flow into the grooves 15. All the four grooves 15 have the same dimensions in width and depth.

The grooves 15 thus formed in the inner circumferential surface 14 of the rebound cushion 8 promotes forming of an oil film between the inner circumferential surface 14 and the outer circumferential surface of the piston rod 5 and prevents solid-to-solid contact therebetween.

The hydraulic shock absorber 1 is operated in a state where the piston rod 5 connected to a vehicle body while the outer tube 2 and the inner tube 3 are connected to the front wheel.

Figure 3:
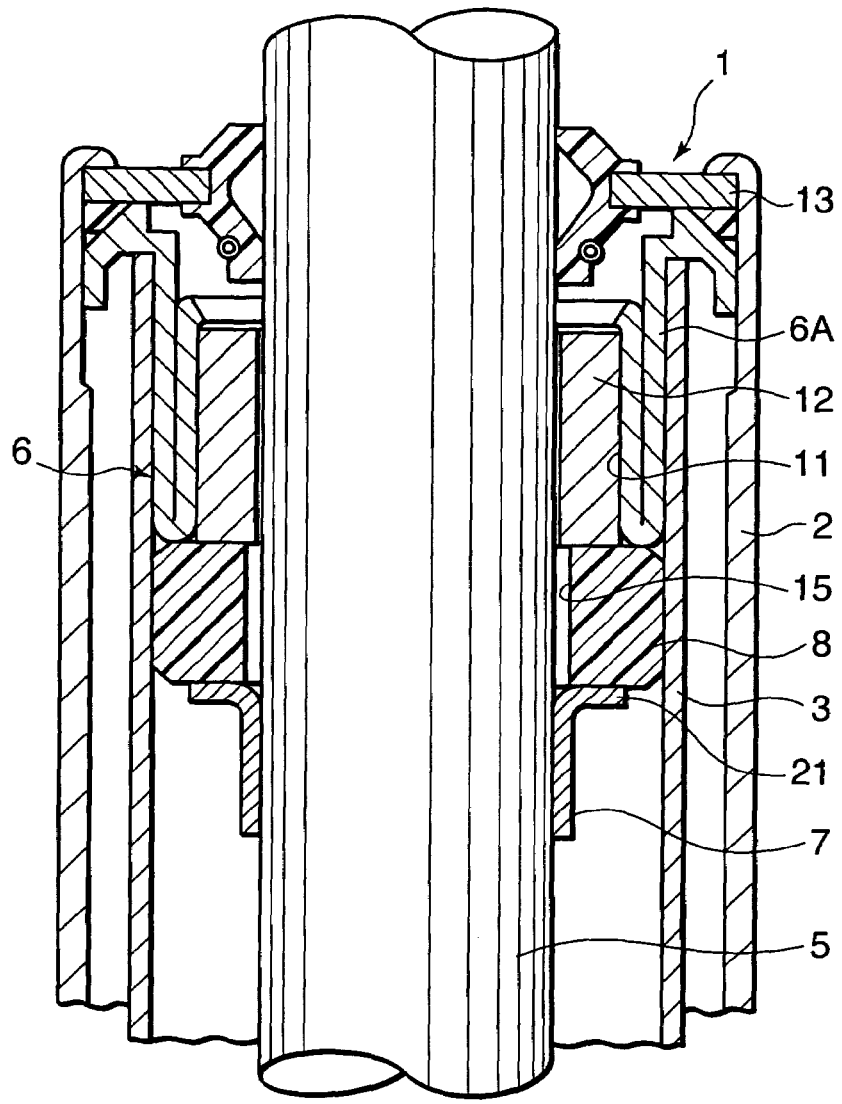
FIG. 3 is a longitudinal sectional view of essential parts of the hydraulic shock absorber in a state where a piston rod has fully protruded from a cylinder.

Referring to FIG. 3, when the piston rod 5 reaches to the protrusion limiting position, the rebound cushion 8 is compressed between the rod guide 6 and the flange part 21 and bulges outward, thereby absorbing a shock generated due to contact of the rebound cushion 8 with the rod guide 6 at the protrusion limiting position. Herein, the rod guide 6 serves as a stopper that restricts further protrusion of the piston rod 5 and therefore corresponds to the stopper in the claims.

When a driver of the vehicle operates a steering wheel of the vehicle in this state, in the hydraulic shock absorber 1, the piston rod 5 rotates with respect to the inner tube 3. The rebound cushion 8 of which the outer circumferential surface is pressed against the inner tube 3 and the upper end is pressed against the rod guide 6 rotates together with the inner tube 3 with respect to the piston rod 5. As a result, the inner circumferential surface 14 of the rebound cushion 8 slides on the outer circumferential surface of the piston rod 5. Herein, the inner circumferential surface 14 corresponds to the sliding surface in the claims and the outer circumferential surface of the piston rod 5 corresponds to the other surface in the claims.

The four vertical grooves 15 in this motion continuously supply oil to the inner circumferential surface 14 of the rebound cushion 8 to prevent the oil film formed thereon from tearing. Consequently, a smooth relative rotation between the rebound cushion 8 and the piston rod 5 is realized, and generation of noise or wear of the rebound cushion 8 are prevented from occurring.

Further, the four grooves 15 formed in the inner circumferential surface 14 of the rebound cushion 8 has an effect of decreasing the contact area between the inner circumferential surface 14 of the rebound cushion 8 and the outer circumferential surface of the piston rod 5. Decrease in the contact area results in a decrease in the frictional resistance between the rebound cushion 8 and the piston rod 5, which also helps in suppression of noise and wear of the rebound cushion 8.

In this embodiment, the grooves 15 are designed to have open ends, but it is still possible to close an end or the both ends of the grooves 15.

In this embodiment, the four grooves 15 are formed to have the same width and depth, but it is also possible to form the grooves 15 to have different widths and/or depths. It is needless to say that the number of the grooves 15 should not limited to four.

Figure 4:
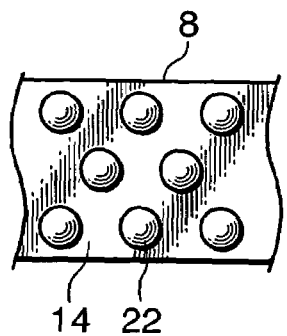
FIG. 4 is a development elevation of an inner circumferential surface of a rebound cushion according to a second embodiment of this invention.

Next, referring to FIG. 4, a second embodiment of this invention will be described.

In this embodiment, instead of the grooves 15 of the first embodiment, a number of minute projections 22 are formed in the inner circumference surface 14 of the rebound cushion 8. The other components of this embodiment are identical to those of the first embodiment.

Herein, a space formed by the projections 22 between the inner circumference surface 14 and the outer circumferential surface of the piston rod 5 acts as a oil pool and continuously supplies oil to form an oil film on the inner circumferential surface 14. So the oil film is prevented from tearing when the steering wheel is operated in a state where the piston rod 5 is at the protrusion limiting position shown in FIG. 3. According also to this embodiment, a preferable effect on the prevention of noise generation and on the prevention of wear of the rebound cushion 8 is obtained as in the case of the first embodiment.

Next, referring to FIGS. 5 and 6, a third embodiment of this invention will be explained.

This embodiment differs from the first embodiment only in the construction of the rebound cushion 8. The other features of this embodiment are identical to those of the first embodiment.

Figure 5:
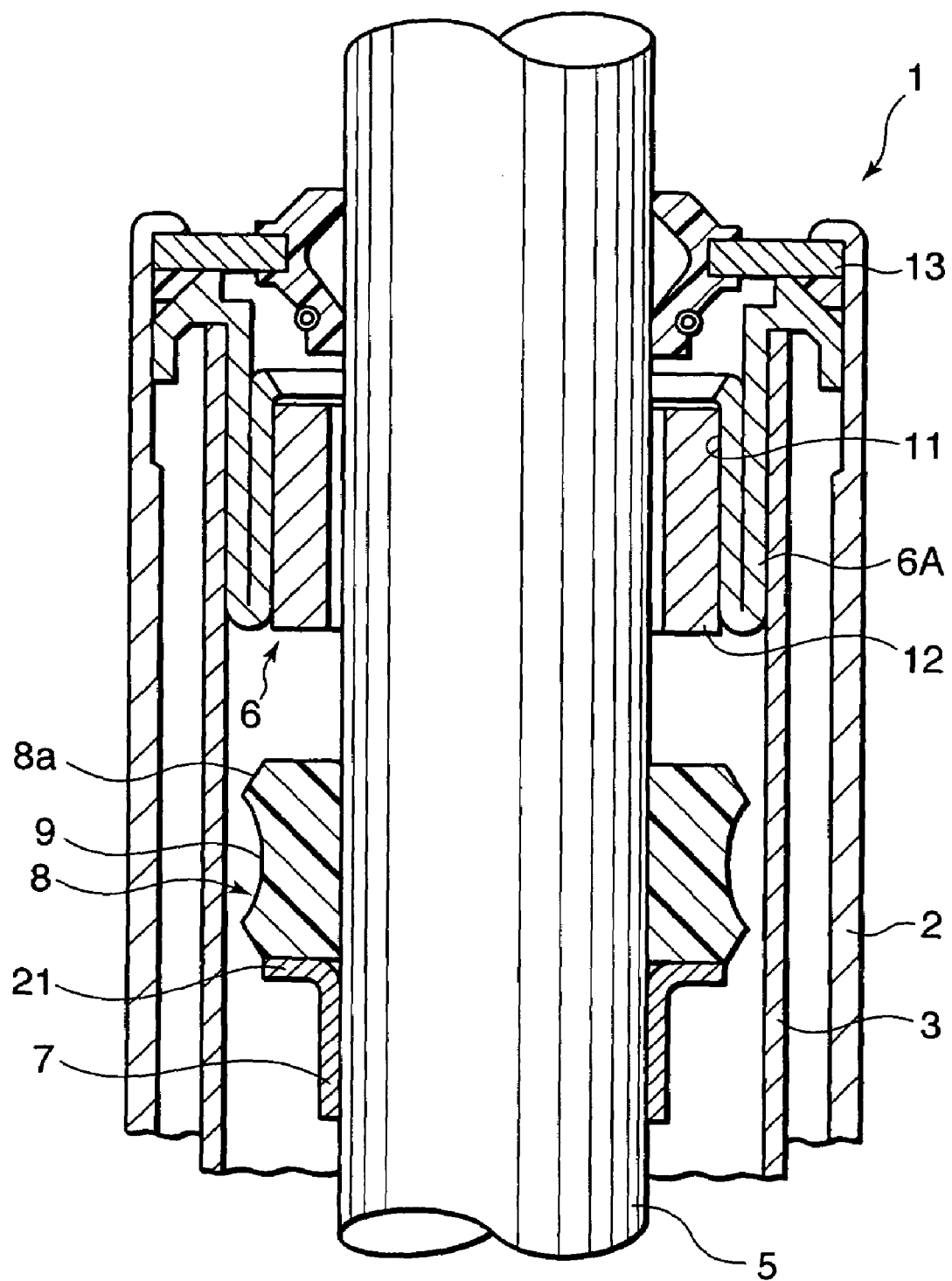
FIG. 5 is similar to FIG. 1, but shows a third embodiment of this invention.

Referring to FIG. 5, in this embodiment, a horizontal groove 9 is formed in an entire outer circumferential surface 8a of the rebound cushion 8. The groove 9 has a vertical section of arc shape. Further, the outer circumferential surface 8a above the horizontal groove 9 has a first tapered shape such that the diameter of the rebound cushion 8 decreases towards the flange part 21. As shown in FIG. 5, the first tapered shape intersects with the groove 9 at an intersecting point thereof, and the second tapered shape intersects with the groove 9 at an intersecting point thereof.

Figure 6:
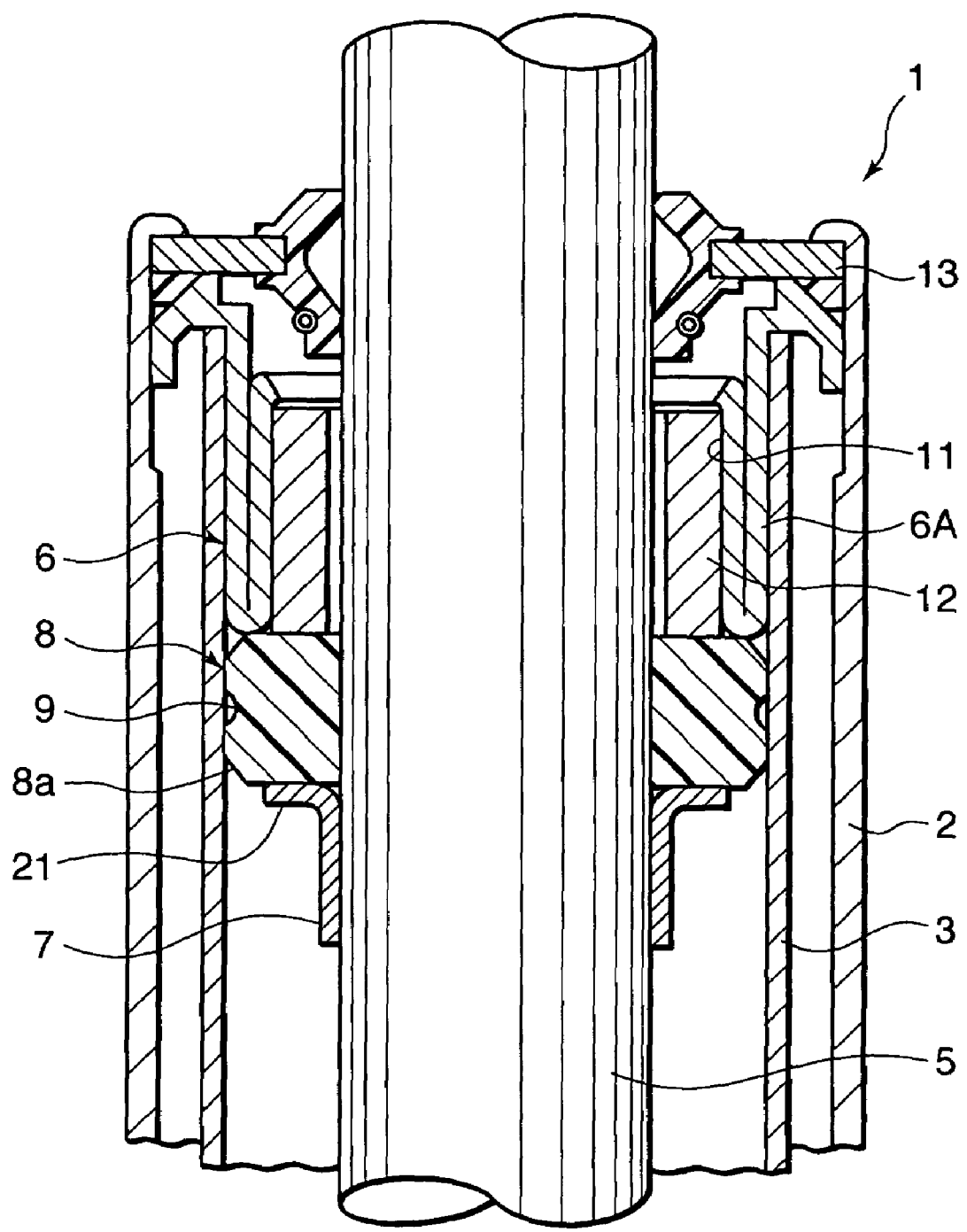
FIG. 6 is a longitudinal sectional view of essential parts of the hydraulic shock absorber according to the third embodiment of this invention showing a state where a piston rod has fully protruded from a cylinder FIG. 7 similar to FIG. 1, but shows a fourth embodiment of this invention.

Referring to FIG. 6, when the piston rod 5 has reached the protrusion limiting position, the rebound cushion 8 is compressed between the rod guide 6 and the flange part 21 and bulges outward or radially, thereby absorbing a shock generated due to contact of the rebound cushion 8 with the rod guide 6.

In this state, oil in the groove 9 is supplied to the outer circumferential surface 8a of the rebound cushion 8 to form an oil film thereby preventing solid-to-solid contact from occurring between the inner circumferential surface of the inner tube 3 and the outer circumferential surface 8a of the rebound cushion 8. The rebound cushion 8 contacts the inner tube 3, such that the intersecting points of the outer circumferential surface 8a with the groove 8 become in contact with the inner circumferential surface of the inner tube 3 at the protrusion limiting position of the piston rod 5. Herein, the outer circumferential surface 8a corresponds to the sliding surface in the claims and the inner circumferential surface of the inner circumferential surface of the inner tube 3 corresponds to the other surface in the claims.

Further, oil enclosed in a space formed by the outer circumferential surface 8a above the groove 9 of the rebound cushion 8, the inner circumferential surface of the inner tube 3, and the rod guide 6 is supplied to the upper end surface of the rebound cushion 8 to form an oil film thereby preventing solid-to-solid contact from occurring between the rebound cushion 8 and the rod guide 6.

When the driver of the vehicle operates the steering wheel of the vehicle in this state, in the hydraulic shock absorber 1, the rebound cushion 8, unlike the case of the first embodiment, rotates together with the piston rod 5 by sliding the outer circumferential surface 8a on the inner circumferential surface of the inner tube 3 as well as sliding the upper end surface on the rod guide 6. During this rotational displacement, oil is continuously provided to the both sliding surfaces from the oil pool in the groove 9 and the oil pool formed by the outer circumferential surface 8a of the rebound cushion 8, the inner circumferential surface of the inner tube 3 and the rod guide 6, so the oil films formed on these sliding surfaces will not tear. Therefore, when the driver steers the vehicle in a state where the piston rod 5 is fully protruded, noise generation and/or wear of the rebound cushion due to tear of oil film on the sliding surfaces are prevented from occurring, and a smooth rotation of the rebound cushion 8 with respect to the inner tube 3 and the rod guide 6 is ensured.

This embodiment can be realized by modifying a shape of only a part of the outer circumferential surface of the rebound cushion of the prior art, so the implementation of the invention is quite easy. Further, according to this embodiment, the prevention of tear of the oil film can be achieved without affecting the elastic characteristics of the rebound cushion 8

According to this embodiment, the groove 9 is formed continuously in the outer circumferential surface 8a of the rebound cushion 8, but it is also possible to form several non-contiguous grooves instead of the sole continuous groove 9.

Figure 7:
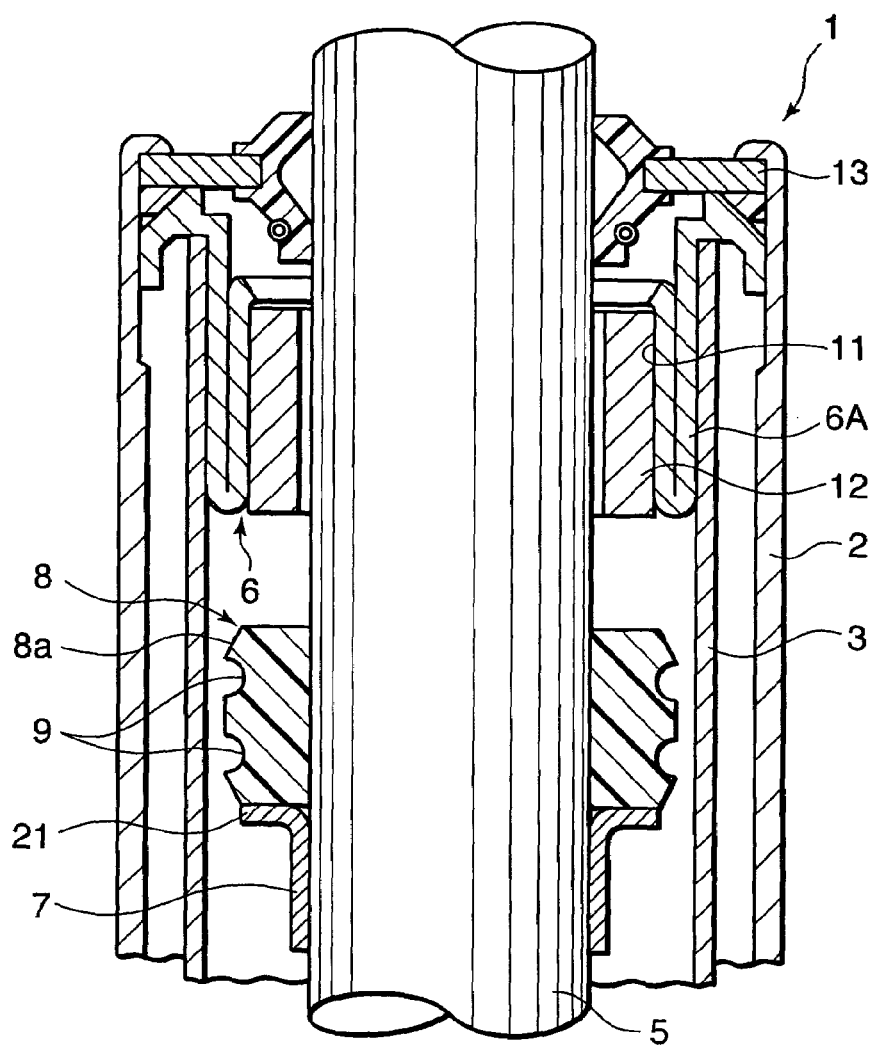

Next, referring to FIG. 7, a fourth embodiment of this invention will be described.

In this embodiment, two parallel grooves 9 are formed in the outer circumferential surface 8a of the rebound cushion 8. The other features of the shock absorber are identical to those of the third embodiment. According to this embodiment also, the prevention of tear of the oil film on the outer circumferential surface 8a of the rebound cushion 8 as well as the prevention of tear of the oil film on the upper end surface of the rebound cushion 8 are achieved as in the case of the third embodiment. It should be noted that the number of the grooves 9 can be increased according to a design choice.

Figure 8:
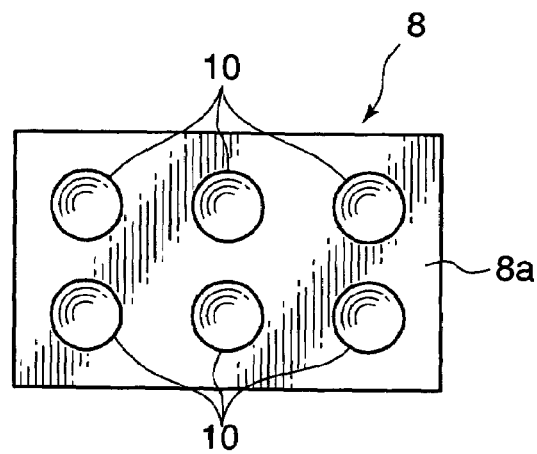
FIG. 8 is a development elevation of an inner circumferential surface of a rebound cushion according to a fifth embodiment of this invention.
Figure 9:
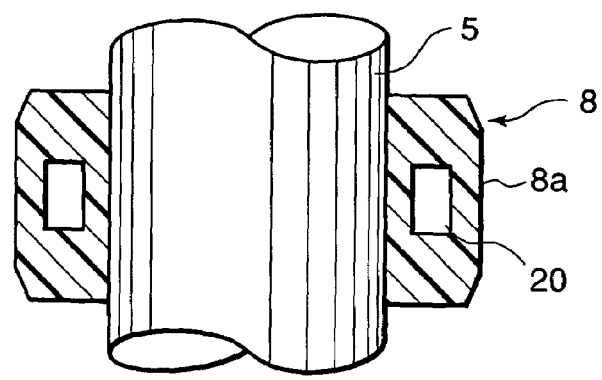
FIG. 9 is a longitudinal sectional view of a rebound cushion according to a sixth embodiment of this invention.
Figure 10:
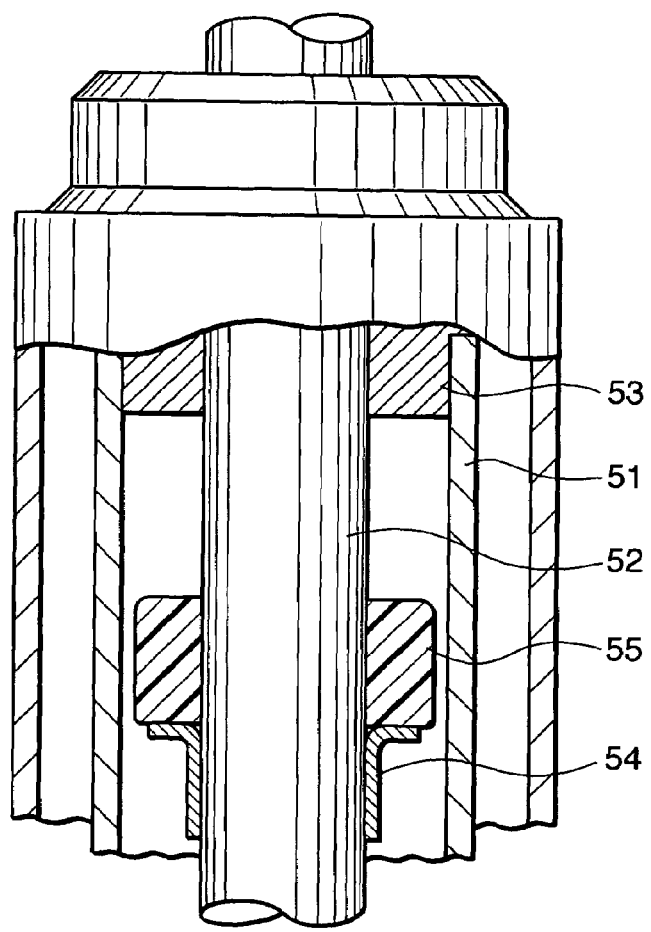
FIG. 10 is a longitudinal sectional view of essential parts of a hydraulic shock absorber according to a prior art.
Figure 11:
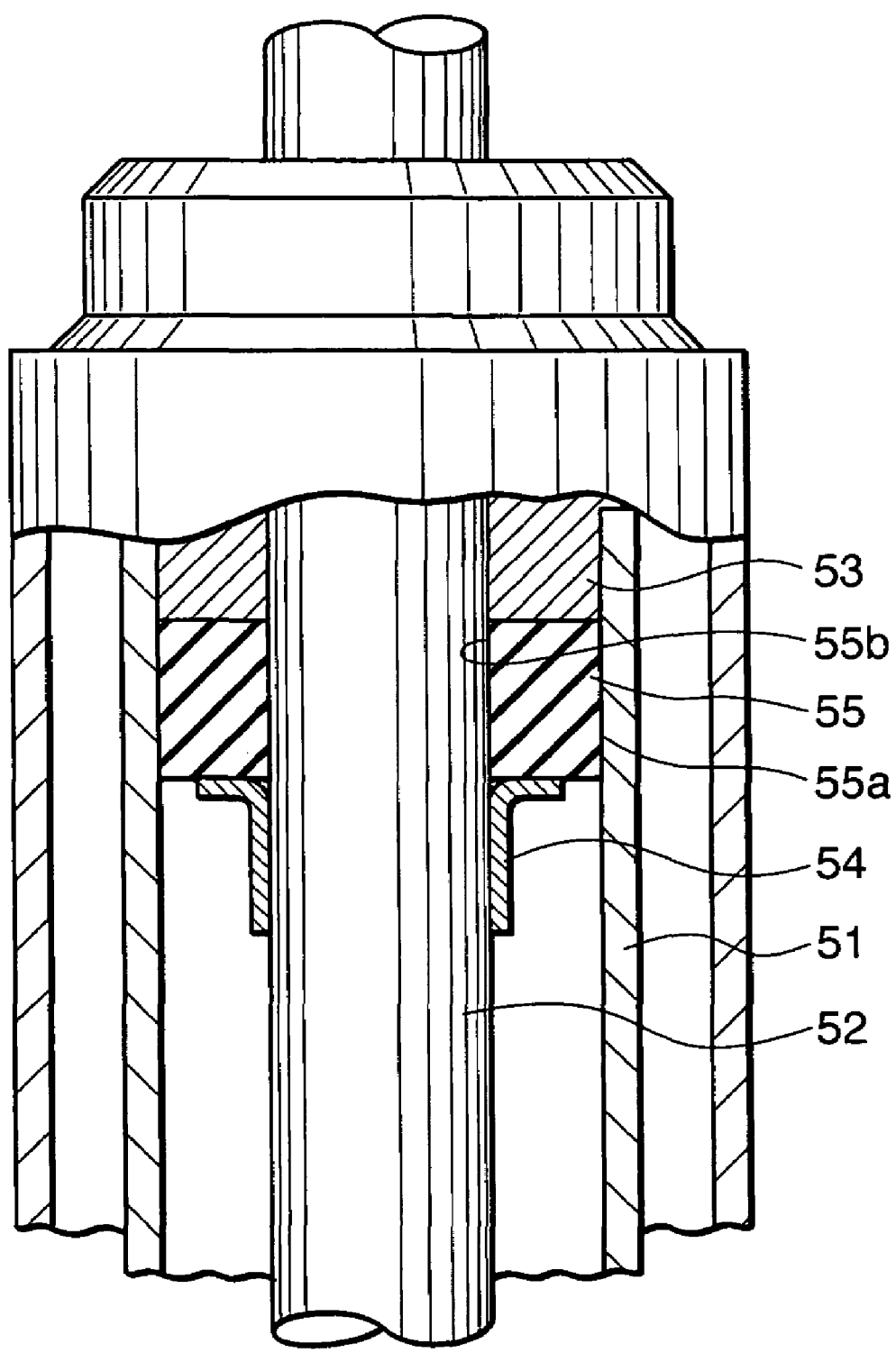
FIG. 11 is a longitudinal sectional view of essential parts of the hydraulic shock absorber according to the prior art showing a state where a piston rod has fully protruded from a cylinder

Next, referring to FIG. 8, a fifth embodiment of this invention will be described.

According to this embodiment, a plurality of recesses 10 are formed in the outer circumferential surface 8a of the rebound cushion 8 instead of the grooves 9 of the fourth embodiment.

Each of the recesses 10 functions as an oil pool when the rebound cushion 8 bulges outward and its outer circumferential surface 8a is pushed towards the inner circumferential surface of the inner tube 3 when the piston rod 5 has reached the protruding limiting position. Oil supplied from this oil pool form an oil film on the outer circumferential surface 8a of the rebound cushion 8, and decrease the friction resistance between the rebound cushion 8 and the inner tube 3. In this embodiment also, the outer circumferential surface 8a above the recesses 10 has a tapered shape.

According to this embodiment, therefore, the prevention of tear of the oil film on the sliding surfaces of the rebound cushion 8 is achieved as in the case of the third embodiment.

It should be noted that the number of the recesses 10 can be set arbitrarily according to a design choice.

Next, referring to FIG. 8, a sixth embodiment of this invention will be described.

In this embodiment, a hollow part 20 is formed in the rebound cushion 8 instead of the groove 9 of the third embodiment. The hollow part 20 is formed in a shape of a ring surrounding the piston rod 5.

The hollow part 20 thus formed is squashed and causes the outer circumferential surface 8a of the rebound cushion 8 to form a recess, when the piston rod 5 has reached the protrusion limiting position and the rebound cushion 8 is compressed between the rod guide 6 and the flange part 21. This recess functions as an oil pool as in the case of the groove 9 of the third embodiment, and provides oil to the outer circumferential surface 8a of the rebound cushion 8 so as to form an oil film thereon. In this embodiment also, the outer circumferential surface 8a above the recess has a tapered shape.

According to this embodiment, therefore, the prevention of tear of the oil film on the sliding surfaces of the rebound cushion 8 is achieved as in the case of the third embodiment.

It should be noted that the hollow part 20 may not be formed continuously in the rebound cushion 8. Further, the hollow part 20 may be filled with a filling material that is easily deformed in comparison with the material forming the rebound cushion 8.

The contents of Tokugan 2004-295888 with a filing date of Oct. 8, 2004 and Tokugan 2004-230042 with a filing date of Aug. 6, 2004 in Japan, are hereby incorporated by reference.

Although the invention has been described above by reference to certain embodiments of the invention, the invention is not limited to the embodiments described above. Modifications and variations of the embodiments described above will occur to those skilled in the art, within the scope of the claims.

For example, in the above embodiments, this invention is applied to a double-tube strut-type hydraulic shock absorber 1, but this invention can be applied to any type of hydraulic shock absorber including a single-tube type. It is also possible to apply this invention to a shock absorber not for a vehicle.

The embodiments of this invention in which an exclusive property or privilege is claimed are defined as follows:

What is claimed is:

1. A hydraulic shock absorber comprising:
a cylinder having an inner space filled with hydraulic fluid;
a piston rod axially protruding from the cylinder;
a rebound cushion which is fitted to an outer circumferential surface of the piston rod in the cylinder and supported axially by the piston rod, the rebound cushion having an end face, a bottom face, and an outer circumferential surface; and
a stopper fixed to the cylinder and contacting the end face of rebound cushion at an protrusion limiting position of the piston rod to prevent further protrusion of the piston rod,
the outer circumferential surface of the rebound cushion including:

a first tapered portion intersecting with the end face, the first tapered portion having a diamter which gradually decreases towards the end face;

a second tapered portion intersecting with the bottom face, the second tapered portion having a diamter which gradually decreases towards the bottom face; and a groove having a arc-shaped cross section and formed in a circumferential direction along an entire circumference of the rebound cushion, the groove intersecting with the first tapered portion and the second tapered portion such that the outer circumferential surface of the rebound cushion includes only one single groove;

wherein the groove forms a first oil pool which supplies the hydraulic fluid between the outer circumferential surface of the rebound cushion and the inner circumferential surface of the cylinder, and the first tapered portion, the inner circumferential surface of the cylinder and the stopper forms a second oil pool which supplies the hydraulic fluid between the end face of the rebound cushion and the stopper at the protrusion limiting position of the piston rod, in a state where an intersecting point of the first tapered portion and the groove, and an intersecting point of the second tapered portion and the groove come into contact respectively with the inner circumferential surface of the cylinder at the protrusion limiting position of the piston rod.

2. The hydraulic shock absorber as defined in claim 1, wherein the rebound cushion is formed of a material selected from the group consisting of natural rubber, and synthetic resin.

3. The hydraulic shock absorber as defined in claim 1, wherein the tapered portion and the second tapered portion are vertically symmetrical.

* * * * *